US010124908B2

(12) United States Patent
Stabler et al.

(10) Patent No.: US 10,124,908 B2
(45) Date of Patent: Nov. 13, 2018

(54) SYSTEMS AND METHODS FOR UNMANNED AERIAL VEHICLE LANDING

(71) Applicant: Kespry, Inc., Menlo Park, CA (US)

(72) Inventors: Benjamin Stuart Stabler, Menlo Park, CA (US); Nathaniel Hall-Snyder, Palo Alto, CA (US); Paul Doersch, San Francisco, CA (US); Marcus Hammond, Palo Alto, CA (US)

(73) Assignee: Kespry Inc., Menlo Park, CA (US)

( * ) Notice: Subject to any disclaimer, the term of this patent is extended or adjusted under 35 U.S.C. 154(b) by 208 days.

(21) Appl. No.: 15/030,808

(22) PCT Filed: Oct. 21, 2014

(86) PCT No.: PCT/US2014/061650
§ 371 (c)(1),
(2) Date: Apr. 20, 2016

(87) PCT Pub. No.: WO2015/108588
PCT Pub. Date: Jul. 23, 2015

(65) Prior Publication Data
US 2016/0257424 A1  Sep. 8, 2016

Related U.S. Application Data

(60) Provisional application No. 61/894,535, filed on Oct. 23, 2013, provisional application No. 61/893,754, filed on Oct. 21, 2013.

(51) Int. Cl.
B64F 1/02 (2006.01)
B64C 39/02 (2006.01)
(Continued)

(52) U.S. Cl.
CPC ............... B64F 1/02 (2013.01); A63H 27/00 (2013.01); A63H 27/12 (2013.01); B60L 11/182 (2013.01);
(Continued)

(58) Field of Classification Search
None
See application file for complete search history.

(56) References Cited

U.S. PATENT DOCUMENTS

2007/0025809 A1  2/2007  Lee et al.
2009/0224097 A1  9/2009  Kariv
(Continued)

FOREIGN PATENT DOCUMENTS

EP   2218642 A2   8/2010
EP   2540623 A2   1/2013
WO   WO 2007-086055 A1   8/2007

OTHER PUBLICATIONS

International Search Report and Written Opinion in International Application No. PCT/US2014/061650 dated Jul. 23, 2015.
(Continued)

Primary Examiner — Jonathan M Dager
Assistant Examiner — Garrett F Evans
(74) Attorney, Agent, or Firm — Veros Legal Solutions, LLP

(57) ABSTRACT

Provided herein are systems and method for autonomously or semi-autonomously landing an unmanned aerial vehicle (UAV) on a landing pad. The landing pad can include features configured to correct misalignment of the UAV on the landing pad. The landing pad can additionally include one or more markers than can be identified by the UAV to aid the UAV in locating the landing pad and determining the location of the UAV relative to the landing pad.

35 Claims, 13 Drawing Sheets

(51) Int. Cl.
*A63H 27/00* (2006.01)
*B64F 1/12* (2006.01)
*B60L 11/18* (2006.01)
*B64F 1/20* (2006.01)
*B64F 1/36* (2017.01)
*G05D 1/10* (2006.01)
*G05D 1/06* (2006.01)

(52) U.S. Cl.
CPC ....... *B60L 11/1816* (2013.01); *B60L 11/1838* (2013.01); *B64C 39/02* (2013.01); *B64C 39/024* (2013.01); *B64F 1/12* (2013.01); *B64F 1/20* (2013.01); *B64F 1/362* (2013.01); *G05D 1/0676* (2013.01); *G05D 1/102* (2013.01); *B60L 2200/10* (2013.01); *B64C 2201/027* (2013.01); *B64C 2201/042* (2013.01); *B64C 2201/123* (2013.01); *B64C 2201/141* (2013.01); *B64C 2201/18* (2013.01); *B64C 2201/182* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2009/0236470 A1 | 9/2009 | Goossen et al. |
| 2009/0306840 A1 | 12/2009 | Blenkhorn et al. |
| 2010/0193626 A1* | 8/2010 | Goossen ................ B64C 37/00 244/2 |
| 2011/0024559 A1* | 2/2011 | McGeer ................ B64C 25/68 244/110 F |
| 2011/0174925 A1* | 7/2011 | Ying ...................... B64F 1/005 244/114 R |
| 2012/0277934 A1* | 11/2012 | Ohtomo ............... G05D 1/0669 701/15 |
| 2015/0069968 A1 | 3/2015 | Pounds |
| 2016/0001883 A1 | 1/2016 | Sanz et al. |

OTHER PUBLICATIONS

Extended European Search Report dated May 29, 2017, received in EP 14878708.8, filed May 12, 2016.

\* cited by examiner

SYSTEMS AND METHODS FOR UNMANNED AERIAL VEHICLE LANDING

CROSS-REFERENCE

This application claims priority to U.S. Provisional Patent Application Ser. No. 61/893,754 filed Oct. 21, 2013 and U.S. Provisional Patent Application Ser. No. 61/894,535 filed Oct. 23, 2013, which are entirely incorporated herein by reference.

BACKGROUND

An unmanned aerial vehicle (UAV), commonly known as a drone and in some cases referred to as a Remotely Piloted Aircraft (RPA), is an aircraft without a human pilot aboard. There are different kinds of drones. A drone may be an unmanned air system (UAS), unmanned aerial vehicle (UAV), remote piloted aircraft systems (RPAS) and model aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs have been simple remotely piloted aircraft, but autonomous control is increasingly being employed.

UAV's are typically deployed for military and special operation applications, but also used in a small but growing number of civil applications, such as policing and firefighting, and nonmilitary security work, such as inspection of power or pipelines.

During use, a UAV may need to take off and land at a designated location. Such designated locations may include landing locations.

Unmanned aerial vehicles (UAVs) may need to land in order to perform routine maintenance, charge on-board energy storage devices, swap on-board energy storage devices, refuel, and/or data transfer. UAVs can operate without a human operator on board the UAV. UAVs can comprise a variety of on board sensors and control systems.

SUMMARY

Recognized herein are various issues with unmanned aerial vehicles (UAV's) currently available. An example issue is the landing and takeoff of a UAV. Currently, some landing stations may not permit a UAV to readily land and takeoff. Additionally, deviations in the location of the landing station can result in inaccurate landing of the UAV on the landing station. The landing station may not be able to communicate its location to the UAV. In some cases, during landing a UAV may stumble and fall sideways, which may damage onboard equipment. Recognized herein is the need for improved methods and systems to permit a UAV to land and take off.

The present disclosure provides systems and methods that permit an unmanned aerial vehicle (UAV) to land on a landing pad of a landing station and take off from the landing pad. Systems and methods provided herein can advantageously permit a UAV to land on a landing pad without substantial or any human control or intervention. Provided herein are systems and methods to land a UAV on a landing structure autonomously or semi-autonomously. The UAV can detect a landing station based on a known location or detection of a marker on the landing structure. The UAV can capture and image of the marker and process the image to determine the location of the UAV relative to the marker on the landing structure. The UAV can approach the landing structure and land with sufficient accuracy such that the UAV can contact the landing structure based on the determination of the landing structure location from the marker. Fine adjustment of the UAV on the landing structure can be achieved with an alignment track on the landing structure. Accurate alignment of the UAV on the landing structure can permit electrical connection between the UAV and an electrical contact or contacts provided on the landing structure.

In an aspect of the present disclosure, a system for landing a UAV comprises a landing pad with a track having a plurality of peaks and valleys, wherein the landing pad (i) comes in contact with a plurality of elongated landing members of the UAV that extend radially from a center of the UAV, which elongated landing members are below a plurality of propulsion units of the UAV, and (ii) corrects misalignment of the UAV as the elongated landing members come in contact with the track.

In an embodiment, the track is a closed or substantially closed track. In another embodiment, the track is configured to absorb impact of the UAV during landing. In another embodiment, the landing pad is configured such that, upon the landing members coming in contact with the track, the elongated landing members rest at the valleys when the UAV is aligned on track.

In an embodiment, the system further comprises a plurality of electrical contacts, wherein the plurality of electrical contacts is activated by pressure from the UAV aligned on the track. In another embodiment, the electrical contacts, when activated, provide power to an energy storage system on-board the UAV. In another embodiment, the electrical contacts, when activated, exchange data with the UAV.

In an embodiment, the landing pad permits the UAV to autonomously land on the track. In another embodiment, the landing pad permits the UAV to autonomously take off from the track.

In an embodiment, the system further comprises a plurality of markers in a predetermined geometric configuration on the landing pad, wherein the markers are detectable by the UAV to identify a location of the landing pad relative to a given location of the UAV. In another embodiment, the plurality of markers is protected from impact with the UAV during landing of the UAV on the landing pad. In another embodiment, the markers are detectable by the UAV while the UAV is in flight.

In another aspect of the present disclosure, a method for landing a UAV comprises (a) providing a landing pad with a track having a plurality of peaks and valleys; (b) bringing a plurality of elongated landing members of the UAV in contact with the track, wherein the plurality of elongated landing members extend radially from a center of the UAV and are below a plurality of propulsion units of the UAV; and (c) correcting any misalignment of the UAV as the elongated landing members come in contact with the track. In an embodiment, (b) and (c) are performed autonomously as the UAV lands on the landing pad.

In an embodiment, the track is a closed or substantially closed track. In another embodiment, the track absorbs impact of the UAV during landing. In another embodiment, upon the landing members coming in contact with the track, the elongated landing members rest at the valleys when the UAV is aligned on track.

In an embodiment, the landing pad further comprises a plurality of electrical contacts that are activated by pressure when the UAV is aligned on the track. In another embodiment, the electrical contacts, when activated, provide power to an energy storage system on-board the UAV. In another embodiment, the electrical contacts, when activated, exchange data with the UAV.

In an embodiment, the landing pad further comprises a plurality of markers in a predetermined geometric configuration on the landing pad, wherein the markers are detectable by the UAV to identify a location of the landing pad relative to a location of the UAV. In another embodiment, the plurality of markers is protected from impact with the UAV during landing of the UAV on the landing pad. In another embodiment, the plurality of markers is detectable by the UAV while the UAV is in flight.

In another aspect of the present disclosure, a method for autonomously landing a UAV comprises capturing one or more images of a plurality of markers on a landing station using one or more cameras on-board the UAV, wherein the plurality of markers have a predetermined geometric configuration; with a computer processor, calculating from the one or more images a location of the UAV relative to the plurality of markers on the landing station; landing the UAV on a track of the landing station, wherein the track has a plurality of peaks and valleys, and wherein the calculated location of the UAV relative to the plurality of markers on the landing station is used to approach and land the UAV on the track; and correcting any misalignment of the UAV on the track.

In an embodiment, the calculating is performed using one or more computer processors onboard the UAV or the landing station. In another embodiment, the one or more images of the plurality of markers are captured by the UAV while the UAV is in flight.

In an embodiment, the plurality of markers comprise each comprises one or more light emitting diodes (LEDs). In another embodiment, the method further comprises synchronizing (1) a flashing of light from the one or more LEDs with (2) capturing one or more images of the plurality of markers using one or more cameras on-board the UAV. In another embodiment, the track absorbs impact of the UAV during landing on the track.

In an embodiment, the method further comprises activating a plurality of electrical contacts when the UAV is aligned on the track. In another embodiment, the electrical contacts provide power to an energy storage system on-board the UAV when activated. In another embodiment, the electrical contacts exchange data with the UAV when activated.

In an embodiment, the plurality of markers is protected from impact with the UAV during landing of the UAV on the landing station. In another embodiment, the track is a closed or substantially closed track. In another embodiment, correcting any misalignment of the UAV on the track comprises correcting any misalignment in three dimensions.

Another aspect provides a computer readable medium comprising machine-executable code that upon execution by one or more computer processors implements any of the methods above or elsewhere herein.

Another aspect provides a system comprising one or more computer processors and memory coupled thereto. The memory comprises machine-executable code that upon execution by the one or more computer processors implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
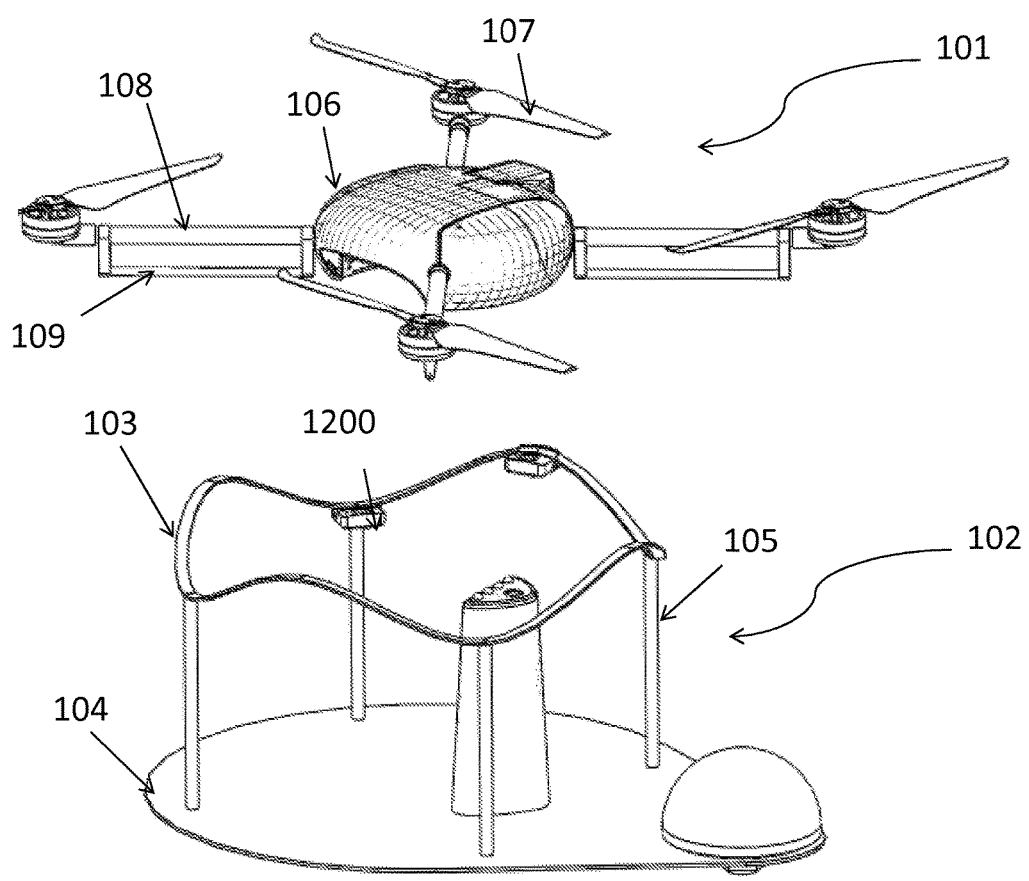
FIG. 1 schematically shows an unmanned aerial vehicle (UAV) and a landing pad.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "unmanned aerial vehicle," as used herein, generally refers to a vehicle that is configured to operate without substantial or any involvement from an on-board operator (e.g., a pilot or driver). A UAV can operate autonomously or semi-autonomously. A UAV can be an aircraft that is configured to automatically take off and land on a landing pad. In some cases, a UAV can automatically travel from one location to another withy any operator involvement.

Provided herein are systems and methods for landing an unmanned aerial vehicle (UAV) on a support structure. A support structure can be a surface, platform, cradle, container, or other structure configured to provide a landing area for the UAV. The support structure can be a landing pad. In some cases, the landing pad can be a location where a UAV is supported while the UAV is not in flight. The UAV can be capable of landing on the landing pad and/or taking off from the landing pad autonomously or semi-autonomously without instructions from a user.

A UAV can travel through a variety of environments. In some cases, a UAV can be configured to conduct surveillance, security, delivery, monitoring, or other tasks that can comprise combining movement and data collection. In some cases, a UAV can travel a distance that exceeds the range of an energy storage device on-board the UAV. It can be advantageous to provide a charging station for the energy storage device at one or more intermediate locations along a travel route of the UAV. In some cases, the UAV can detect and land on the charging station autonomously or semi-autonomously. The charging station can be the landing pad as described herein.

The UAV can comprise a plurality of sensors. The sensors can be configured to collect and transmit data to a memory storage device on-board or off-board the UAV. The UAV can comprise vision sensors, audio sensors, olfactory sensors, and/or tactile sensors. The UAV can comprise locating sensors (e.g., global positioning sensors (GPS), inertial sensors, and/or accelerometers). The UAV can comprise infrared sensors, cameras, radar sensors, laser distance sensors, temperature sensors, moisture sensors, pressure sensors, and/or air speed sensors. The UAV can comprise one or more inertial measurement units (IMU). The IMU can comprise a group of sensors including one or more magnetometers, gyroscopes, and/or accelerometers.

A UAV can be a vehicle that is configured to operate without an on-board operator (e.g., a pilot or driver). A UAV can be an aircraft, such as a plane or helicopter. In some cases, the UAV can receive operating instructions from a remote control. Alternatively, the UAV can operate substantially autonomously without receiving instructions from a user through a remote control or other communication unit. Operation of the UAV can include movement of the UAV, collection of data with one or more sensors on-board the UAV, transmission of data from one or more sensors, and/or processing of data. Movement of the UAV can include take off, landing, flight, and/or locomotion along a surface (e.g., the ground). The UAV can be a ground, water, or aerial vehicle. In the case of an aerial vehicle the UAV can be a fixed wing aerial vehicle. Alternatively the UAV can be a helicopter aerial vehicle comprising one or more rotors. The rotors can provide propulsion and/or lift to the UAV. The UAV can have at least 1, 2, 3, 4, 5, 6, 7, 8, 9, or 10 rotors. In some cases, the UAV can be configured to carry a cargo. The UAV can have a maximum dimension of at most about 500 meters (m), 400 m, 300 m, 200 m, 100 m, 50 m, 30 m, 25 m, 20 m, 15 m, 10 m, 5 m, 4 m, 3 m, 2 m, 1 m, 50 centimeter (cm), 40 cm, 30 cm, 20 cm, 10 cm, 1 cm, 50 millimeters (mm), 10 mm or 1 mm. The UAV can weigh at least about 1 gram (g), 10 g, 100 g, 500 g, 1 kilogram (kg), 2 kg, 3 kg, 4 kg, 5 kg, 10 kg, 20 kg, 30 kg, 40 kg, 50 kg, 100 kg, 250 kg, 500 kg, 1000 kg, 2000 kg, 3000 kg, 4000 kg, or 5000 kg. In some instances the UAV can weigh less than 1 kg, 500 g, 400 g, 300 g, 200 g, 100 g, 50 g, 40 g, 30 g, 20 g, 10 g, or 1 g.

The UAV can be configured to land on a landing pad. The UAV can land and take off from the landing pad autonomously or semi-autonomously. In an autonomous landing or take off, the UAV can receive flight instructions from one or more processors that can be on-board or off-board the UAV. In a semi-autonomous takeoff or landing, the UAV can receive at least a portion of a flight instruction from a user through a remote control or another device in communication with the UAV. The landing pad can be configured such the landing pad permits autonomous or semi-autonomous takeoff and/or landing of the UAV from or on the landing pad, respectively. The landing pad can be a charging station configured to charge an energy storage device on-board the UAV. The landing station can be a base station for communication between a UAV and an off-board computer system. The landing station can be a check point wherein the health or condition of one or more systems on-board the UAV can be monitored.

The landing pad can comprise a corrective feature configured to correct or aid in the correction of misalignment of the UAV on the landing pad. In some cases the corrective feature can be a track having a plurality of peaks and valleys. The peaks and valleys can be maximum and minimum points along the track. FIG. 1 shows a UAV 101 approaching a landing pad 102 in accordance with an embodiment of the invention. The landing pad 102 comprises a track 103. The track 103 can be elevated above a base 104 of the landing pad. The track 103 can be elevated above the base such that undesirable aerodynamic effects (e.g., down wash) can be eliminated or substantially reduced when the UAV is in a close proximity of the landing pad (e.g., during landing and takeoff). The landing pad can be designed such that it does not comprise large closed surfaces. Large closed surfaces can cause down wash and reduce controllability of the UAV. In some cases, the undesirable aerodynamic effects can be substantially reduced such that the UAV can land and take off from the landing pad without adversely affecting controllability of the UAV. The track 103 can be raised above the base of the landing pad on one or more risers 105. The risers can be rods, stilts, or any other structure configured to support the track 103 with or without the landed UAV and withstand an impact of the UAV during landing.

The track 103 can be capable of absorbing force upon the UAV landing on the track 103. In some cases, the track 103 is formed of a polymeric, metallic or composite material. For example, the track 103 can be formed of a spring metal. The track 103 can be formed of a lubricated or lubricating material (e.g., internally lubricated plastic). The track 103 can be flexible, though in some cases in may not be flexible. A flexible material can be a material that can deform plastically in response to an applied force. A flexible material can be a material that can experience repeated force without fatigue.

The track 103 can be a closed track. For instance, the track can have no gaps or openings. Alternatively, the track 103 can have one or more gaps or openings. The track 103 can be configured to absorb impact of the UAV during landing. For example, the track 103 can be configured to absorb force upon impact with a UAV. The track 103 can have an undulating surface. The undulating surface can have a sinusoidal shape such that the track 103 comprises a plurality of peaks and valleys. The peaks can be local maxima and the valleys can be local minima along the track. The peaks can be portions of the track with a maximum height relative to a surface of the base. The valleys can be portions of the track with a minimum height relative to a surface of the base. In some cases the risers can be connected to the track in the location of the valley.

In some examples, the track has a diameter that is from about 400 mm to 600 mm. In some instances, the track can have a diameter that is less than or equal to about 600 mm, 500 mm, 400 mm, 300 mm or 200 mm. In some instances, the track can have a diameter that is greater than or equal to about 200 mm, 300 mm, 400 mm, 500 mm or 600 mm. In some cases, the track includes at least 2n peaks and 2n valleys, where 'n' is a number greater than or equal to two. For example, the track can include at least 4, 6, 8, 10 or 12 peaks and at least 4, 6, 8, 10 or 12 valleys. The number of peaks can be equal to the number of valleys.

A UAV can land on the landing pad. The UAV can have a body 106. The body 106 can comprise a housing, one or more processors, one or more sensors, and or one or more energy storage units. The UAV can further comprise one or more propulsion units 107, for example, a propulsion unit can be a rotor. The one or more propulsion units 107 can be extended from the body of the UAV by an arm 108. The arms can extent radially from the center of the body 106 of the UAV. The arm 108 can have an elongated landing member 109 (e.g., a rail) oriented in the same vertical plane as the arm 108. The elongated member 109 can be below the arm 108 such that the elongated member is on a side of the arm opposite a contact point with the propulsion unit 107. The elongated member 109 can be below a plurality of propulsion units 107 of the UAV. The rail 109 can contact the track when the UAV is landed on the landing pad.

Figure 2:
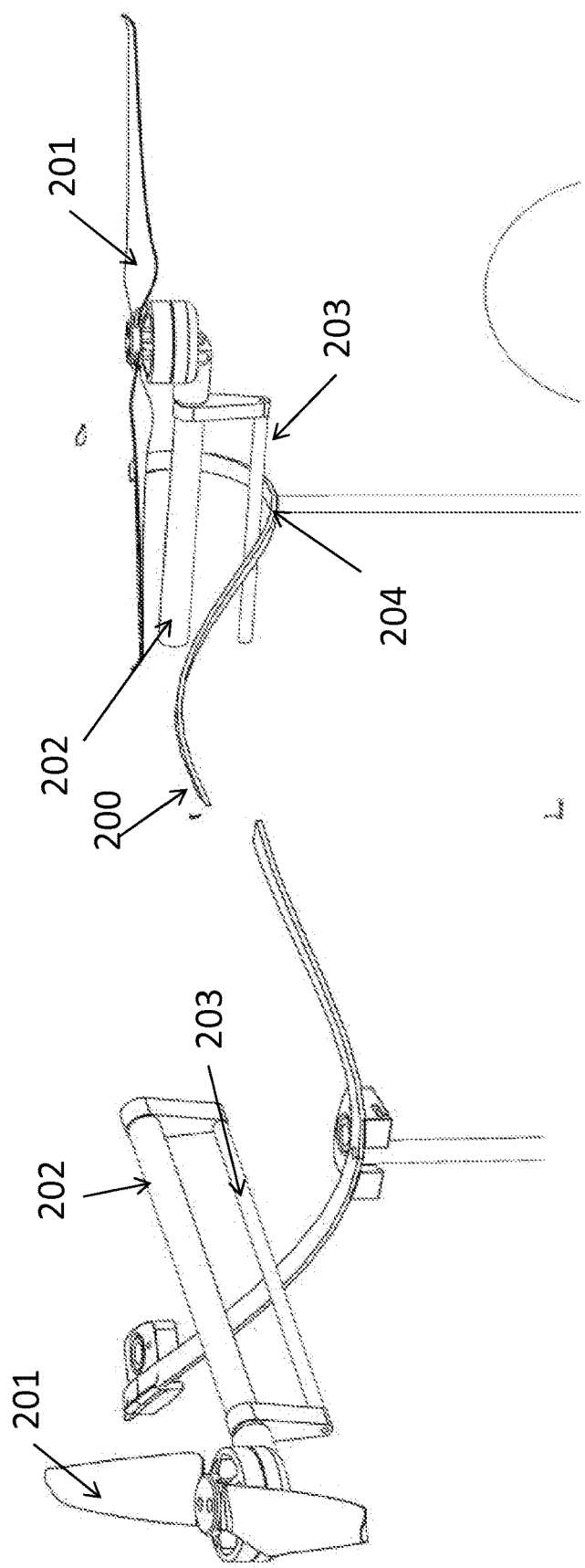
FIG. 2A is a close up view of a rail misaligned on a track on a landing pad.
FIG. 2B is a close up view of a rail correctly aligned on a track on a landing pad.

FIG. 2A shows a close up image of a valley of the landing track and a propulsion 201 unit attached to an arm 202. The arm has a rail 203 attached to the side of the arm below the attachment of the propulsion unit. The rail can contact the track when the UAV is landed on the landing pad. A portion of the track is shown in FIG. 2B. In a correct alignment of the UAV on the landing pad the rail can rest in a valley of the track, as shown in FIG. 2B. In some instances the UAV can land on the landing pad such that the rail is misaligned on the track, as shown in FIG. 2A. The peaks and valleys can correct misalignment of the rail on the track. For example, the momentum of the UAV can drive the rail to a valley of the track, thereby bringing the UAV in alignment with the track.

The rail can be configured to withstand a force when the UAV contact the track. The force generated by the UAV coming into contact with the track can be a compressive force and/or a shear force. In some cases the rail can comprise a spring, oil, air, or elastomeric shock absorber configured to absorb the force. The rail can be flexible such that it can absorb the force. In some cases the rail can be composed of a flexible material, such as a polymeric material (e.g., plastic). As an alternative, the rail can be formed of a metallic or composite material. The rail can be formed of a lubricated or lubricating material (e.g., internally lubricated plastic). A flexible material can be a material that can deform plastically in response to an applied force. A flexible material can be a material that can experience repeated force without fatigue. In some examples, the rail can deform more than the track. This can permit the rail to absorb most or the majority of the energy on impact with the track.

Figure 3:
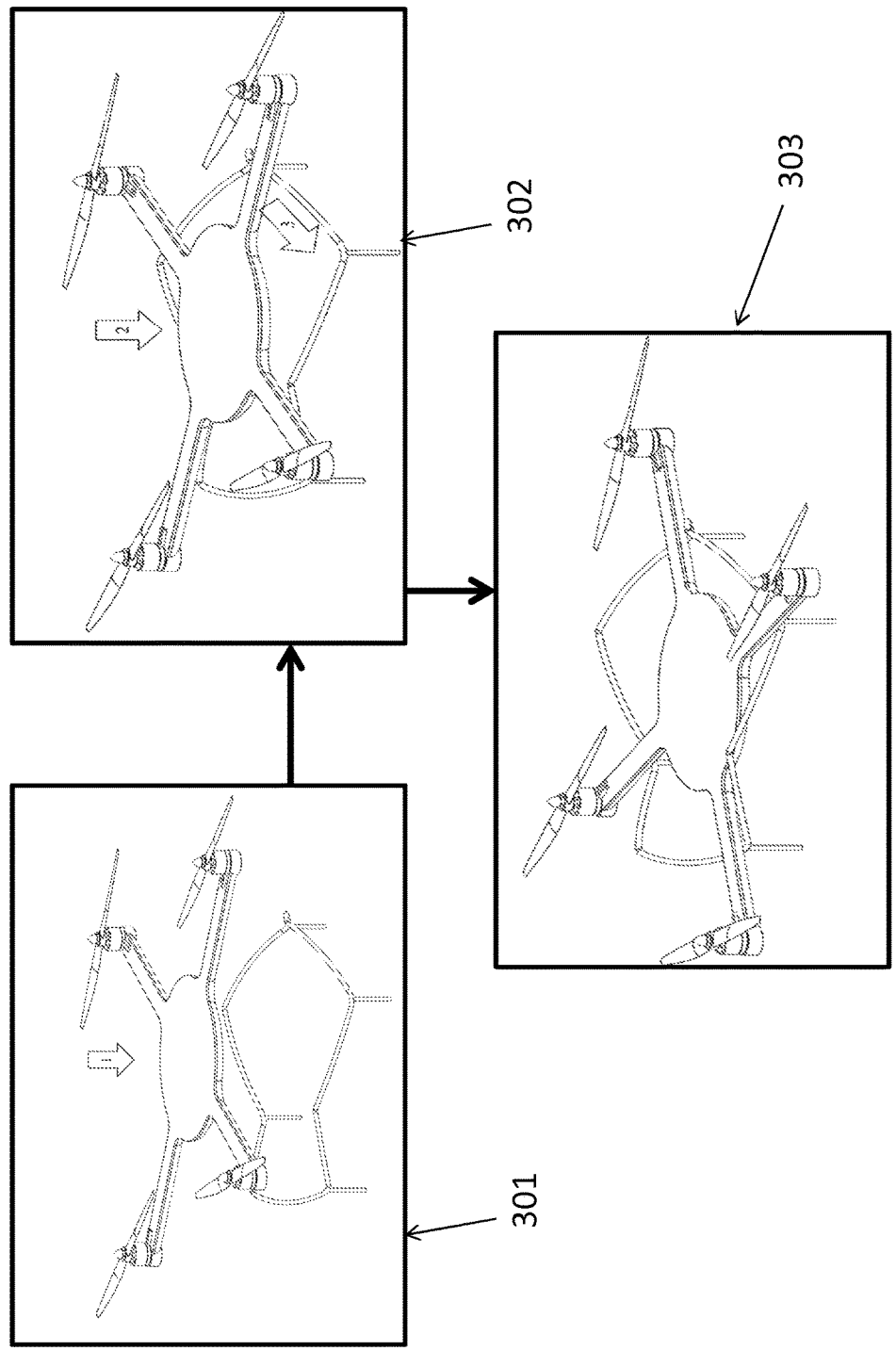
FIG. 3 is cartoon of a process of landing and aligning a UAV on a track on a landing pad.

In some cases, a UAV can land on the landing pad such that one or more rails are not oriented at the bottom (e.g., minimum height) of one or more valleys on the landing track. The UAV can be correctly aligned on the track when the rails oriented at the bottom of one or more valleys. FIG. 3 shows a UAV landing on a landing pad. A UAV can approach the landing pad 301. In some cases, the UAV can approach the landing pad and align itself directly above the track on the landing pad. The UAV can land on the landing pad such that the rails come in contact with a surface of the track. The rails can contact the surface of the track such that one or more of the rails are not oriented at the bottom (e.g., minimum height) of one or more valleys on the landing track 302. A force (e.g., gravity) can cause the rails to slide along the track until the one or more rails are in one or more valleys on the landing track. The track can passively correct alignment of the UAV on the track using a gravitational force. The UAV can be aligned on the track without moving parts and/or intervention from a human operator. The UAV can be aligned on the track in six axes. Misalignment of the UAV on the track can be passively corrected in three-dimensions. The track can passively align the UAV with at least 3 degrees of freedom (e.g., x, y and z axes). A predetermined height and angle of the UAV on the track can be achieved by movement of the UAV on the track in response to a gravitational force. The predetermined height and angle can comprise a correctly aligned position of the UAV on the track. The UAV rails can slide along the track until a correct alignment of the UAV rails is achieved 303. The rails can force the UAV into alignment such that the final resting position of the UAV can vary from a correctly aligned position in any direction by at most about 50 mm, 40 mm, 30 mm, 20 mm, 10 mm, 5 mm, 2 mm, 1 mm, 0.5 mm, 0.1 mm, 0.01 mm, or 0.001 mm. In some cases the rails can comprise a roller bearing configured to reduce friction during sliding along the track. Once the UAV rails achieve the correct alignment on the track the rails can rest in the location of proper alignment. Proper alignment of the UAV on the track can be achieved when the rails are in the valleys of the track.

The rails can be configured such that the one or more rotors of the UAV can rotate without contacting and/or colliding with the track. FIG. 2B shows an embodiment of the invention where the UAV is aligned on the landing pad such that the rail 203 is resting in a valley 204 of the landing track 200. A propulsion unit 201 is attached to an end (e.g., terminus) of the arm 202. The rail is attached to the arm 202 and is separated from the arm such that the arm and the propulsion unit are kept away from the surface of the track. In some embodiments the arm can be separated from the rail such that the propulsion unit can rotate without contacting the track. The arm can be separated from the rail a distance that is greater than the difference between the highest point in the track (peak) and the lowest point in the track (valley). The rail can be optimized to elevate the propulsion unit from the surface of the track while minimizing the weight of the combined arm and rail.

When the UAV is properly aligned on the track, one or more electrical contacts on the UAV can be positively connected to one or more electrical contacts on the landing pad. The electrical contacts can provide energy to an energy storage system on-board the UAV, permit communication between the UAV and the landing pad, and/or permit data transfer to or from the UAV and/or to or from the landing pad.

Figure 4:
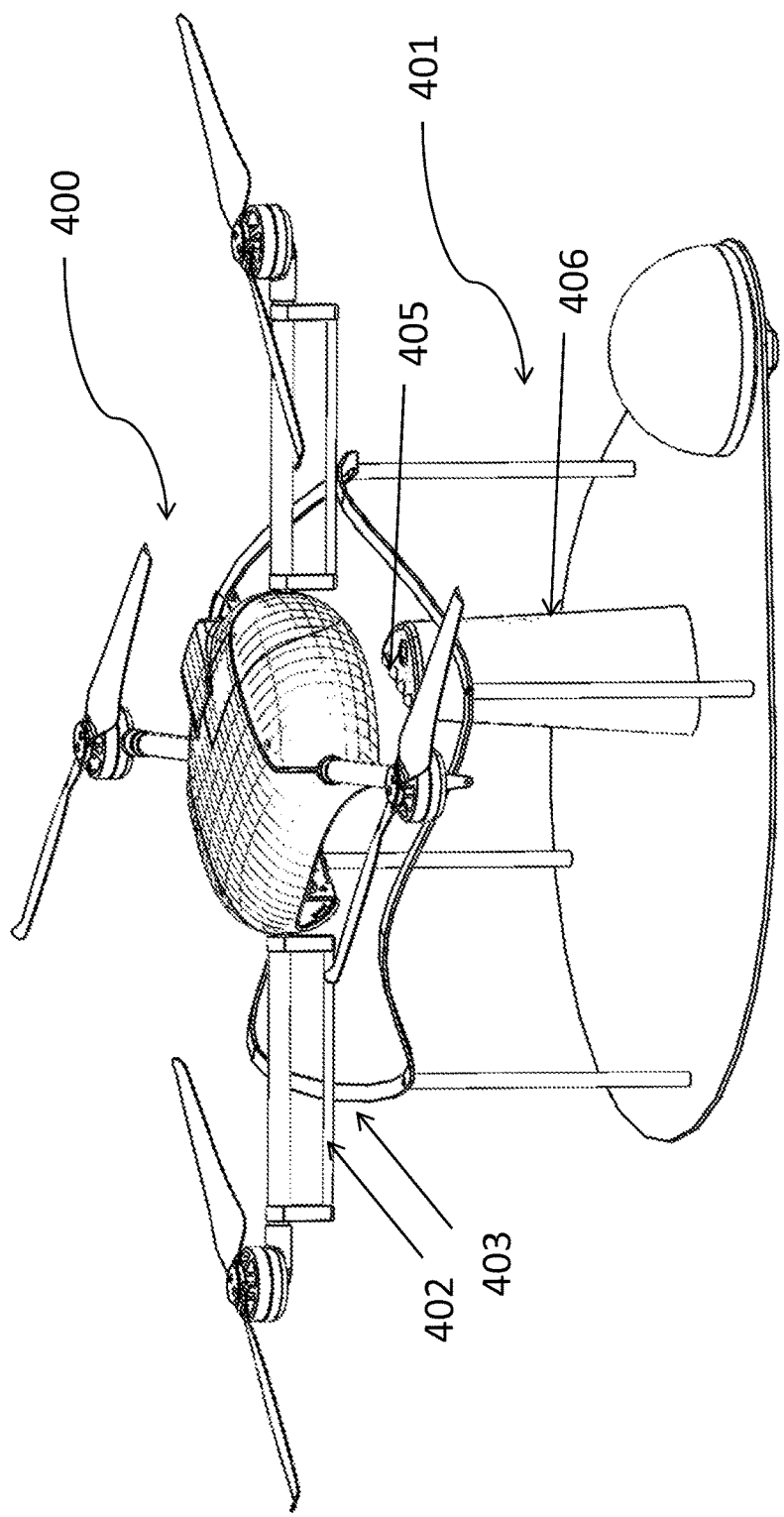
FIG. 4 is a UAV in a misaligned orientation on a landing pad.

FIG. 4 shows an example of a UAV 400 misaligned on the landing pad 401. In some cases, the UAV can be misaligned on the landing pad when the rails 402 contact the landing pad track 403 such that the rails are on a surface of the track that is above the minimum point of a valley on the track. In some cases the electrical contacts 405 can be provided on a structure 406 that extends from the landing pad. Electrical contacts on the UAV can only couple to the electrical contacts 405 provided on the landing pad when the UAV is correctly aligned on the landing pad. In some cases proper alignment on the landing pad can be achieved when the UAV is at a lowest possible resting place on the track. The tolerance of the electrical contacts can be at most about 50 mm, 40 mm, 30 mm, 20 mm, 10 mm, 5 mm, 2 mm, 1 mm, 0.1 mm, or 0.01 mm. The tolerance of the electrical contacts can be a maximum deviation between an electrical contact on the landing station and a UAV electrical contact that can be permitted while maintaining electrical communication. In some cases the UAV can be above the electrical contacts 405 when the UAV is misaligned on the landing pad. When the UAV is misaligned on the landing pad, electrical communication between an electrical contact on the landing pad and an electrical contact on the UAV may not be permitted.

Figure 5:
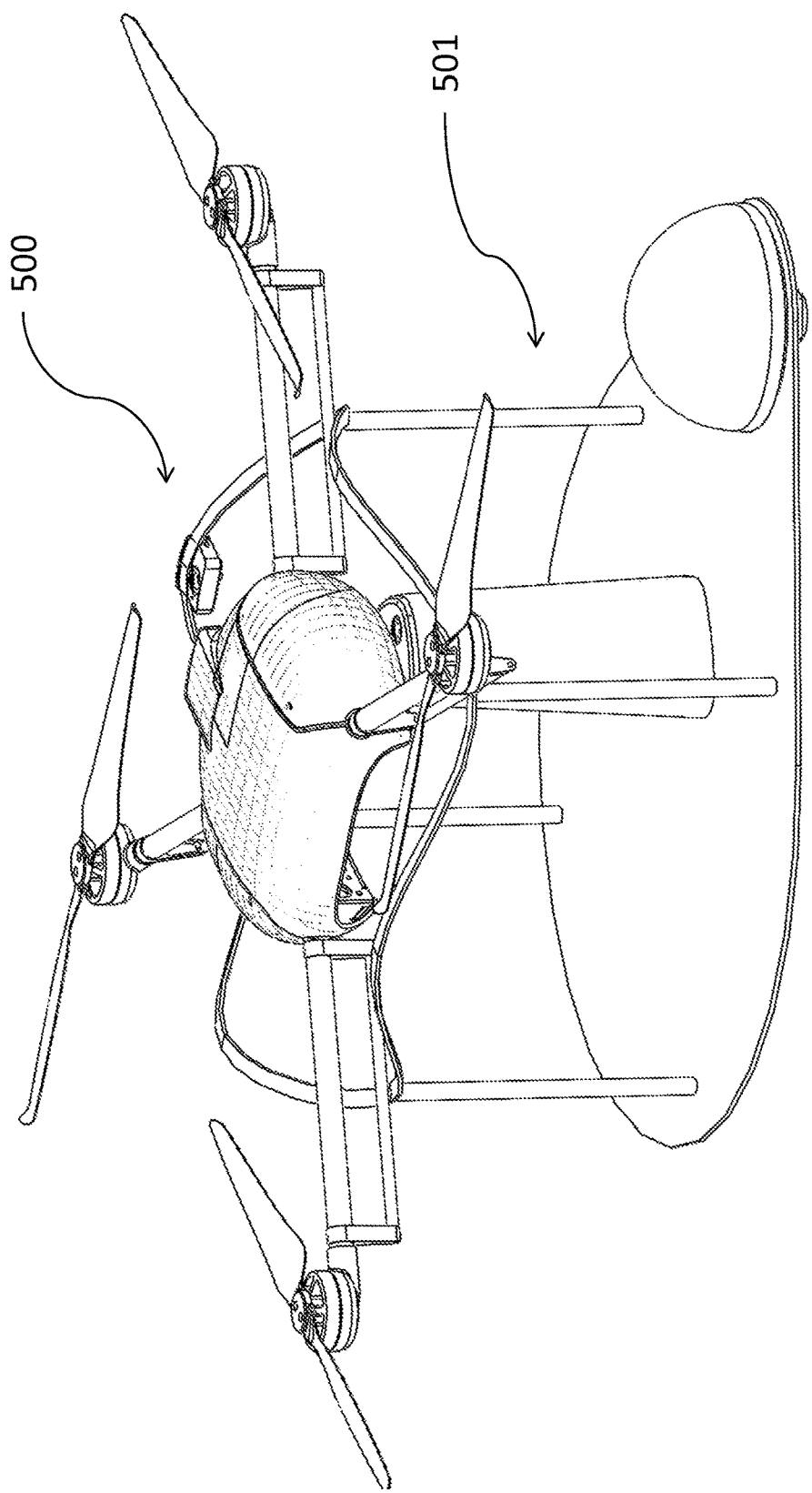
FIG. 5 is a UAV in a correctly aligned orientation on a landing pad.

The landing pad can be configured to automatically correct misalignment of the UAV. In some cases, misalignment of the UAV can be corrected passively, without moving parts or intervention from a third party. Misalignment of the UAV can be corrected by downward sliding of the rails from a point on the track that is higher than a valley to the lowest point of a valley. The downward sliding can be causes by a force that pulls the rail from a point on the track that is higher than a valley to the lowest point of a valley. The force can be gravity. FIG. 5 shows a UAV 500 that is properly aligned on the landing pad 501. When the UAV is properly aligned on the landing pad, one or more electrical contacts on the UAV can couple to one or more electrical contact provided on the landing pad.

The one or more electrical contacts on the UAV can be on either or both of the body of the UAV or the rails extending from the body of the UAV. The UAV can have at least 1, 2, 3, 4, 5, 6, 7, 8, 9, 10, 20, 30, 40, 50, 100, 200, 300, 400, or 500 electrical contacts. In some cases, the electrical contacts can be metal pads. The electrical contacts can be plated with an inert material to reduce corrosion. The electrical contacts can be coated with a metal material to increase electrical conductivity. In some cases the electrical contacts can be gold plated. The electrical contacts on the UAV can provide an exterior connection to a computer system, memory storage device, processor, sensor system, control system, and/or power system on-board the UAV.

The landing pad can comprise electrical contacts on the track. In some cases the landing pad can comprise electrical contacts on a structure that is not the track. The landing pad can have at least 1, 2, 3, 4, 5, 6, 7, 8, 9, 10, 20, 30, 40, 50, 100, 200, 300, 400, or 500 electrical contacts. In some cases, the electrical contacts can be metal pads. The electrical contacts can be plated with an inert material to reduce corrosion. The electrical contacts can be coated with a metal material to increase electrical conductivity. In some cases the electrical contacts can be gold plated. The electrical contacts on the landing pad can be configured to connect with one or more corresponding electrical contacts on the UAV. The electrical contacts can connect with one or more corresponding electrical contacts on the UAV only when the UAV is properly aligned on the track on the landing pad. The electrical contacts on the landing pad can provide an exterior connection to a computer system, memory storage device, processor, sensor system, control system, and/or power system on-board the landing pad.

Figure 6:
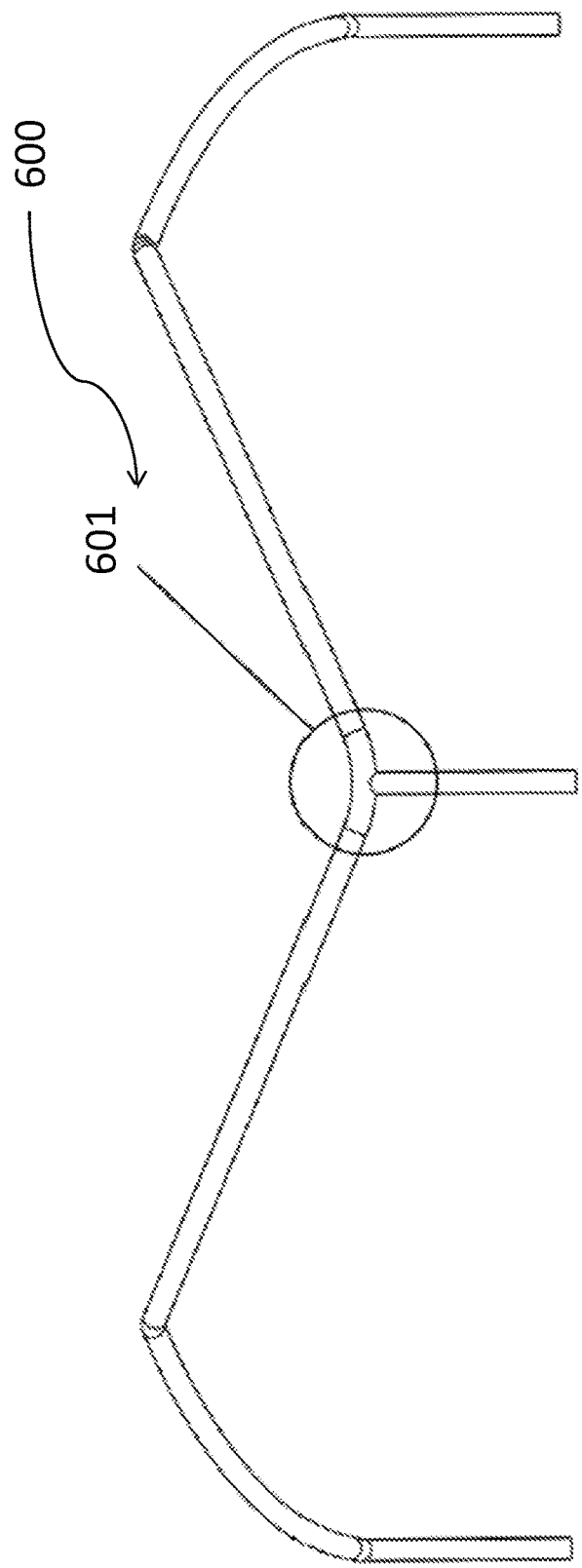
FIG. 6 is an electrical contact on a rail on a landing pad.

In one embodiment the electrical contacts on the track can be located on a surface of the track where there is a valley. FIG. 6 shows a close up view of a track 600 with an electrical contact 601 on a surface of a valley on the track. A UAV can couple to the electrical contact 601 when the UAV is properly aligned on the track. In some examples the UAV can comprise one or more electrical contacts on the one or more rails extending from the UAV. The electrical contacts on the rails can be configured to couple to the electrical contact 601 on the surface of a valley on the track 600. The electrical contact 601 on the surface of a valley on the track can be configured to be rubbed, scratched, and/or scraped by a rail during landing of the UAV on the landing pad without substantial wear or damage.

Figure 7:
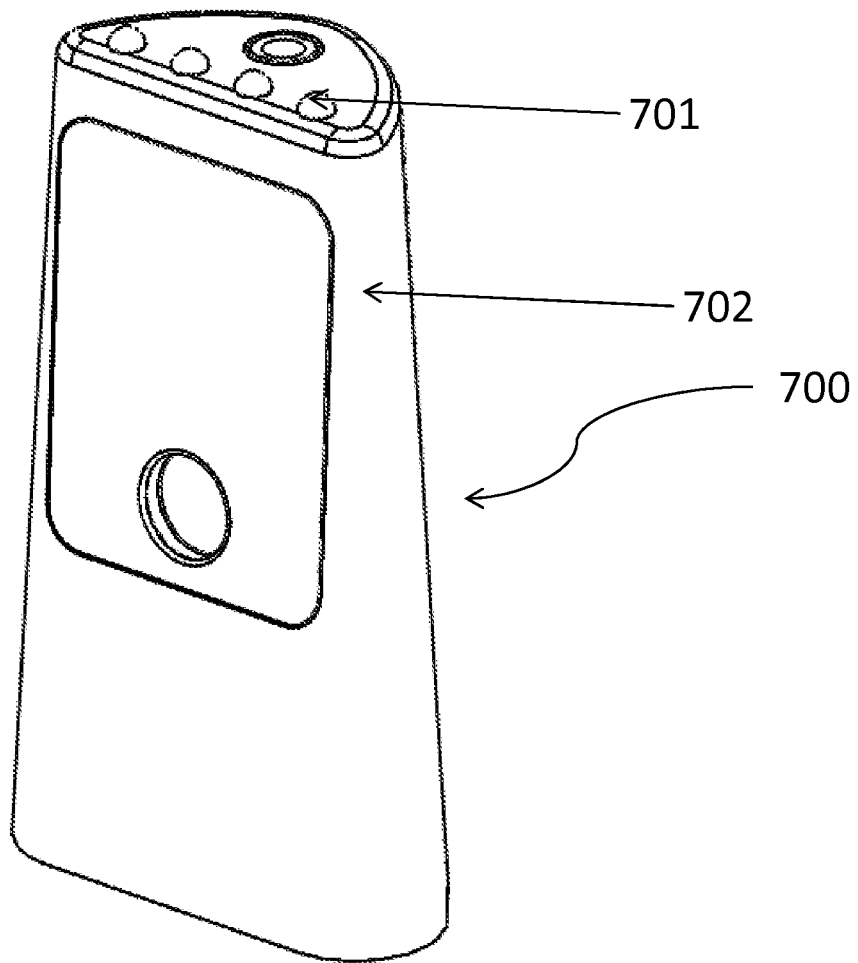
FIG. 7 is a structure comprising electrical contacts.

In an alternate embodiment, the electrical contacts on the landing pad can be provided on a structure that is separate from the track. FIG. 7 shows a possible structure that can be configured to provide electrical contacts on the landing pad. The structure 700 can provide the electrical contacts 701 at a height elevated from a base of the landing pad. The structure 700 can comprise additional electrical component in a housing 702. The additional electrical components can be in communication with the electrical contacts 701 such that when one or more electrical contacts on the UAV are connected to the electrical contacts 701, the electrical components in the structure can communicate with the UAV. For example, the electrical components in the structure can be a backup energy source (e.g., battery or generator), a computer system, or one or more sensors.

Figure 8:
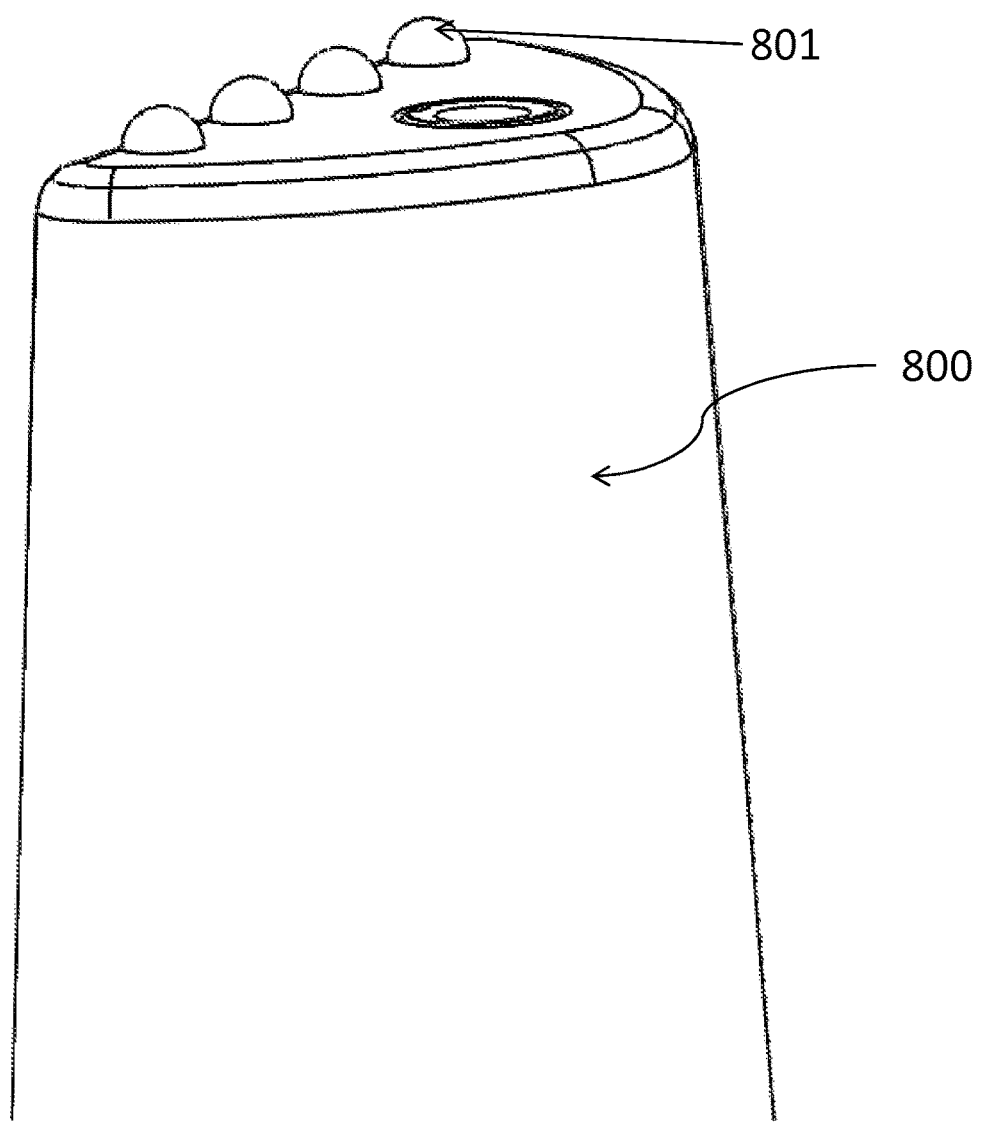
FIG. 8 is a close up view of a structure comprising electrical contacts.

FIG. 8 shows a detailed view of the electrical contacts 801 on the structure 800. The electrical contact can be raised from a surface of the structure. In some embodiments the electrical contact can be pins composed of an electrically conductive material (e.g., metal). The electrical contacts can be configured to depress in response to a force. In an example, a force on the electrical contacts can be a contact force from the weight of the UAV when the UAV is in properly aligned on the landing pad. The electrical contact can be spring loaded. In some cases, the electrical contacts can be in an open circuit position when they are not depressed. When the electrical contacts are depressed, for example, by the weight of the UAV, the electrical contacts can be moved into a position such that they complete a circuit. The electrical contacts can be activated by pressure from the UAV when the UAV is aligned on the track. Activation of the electrical contacts can comprise connecting the electrical contact in a closed circuit configuration. In an open circuit configuration current may not be permitted to flow to the electrical contacts. In a closed circuit configuration current can flow to the electrical contacts. When the electrical contacts are activated, energy (e.g., power) can be provided to an energy storage system on-board the UAV. When the electrical contacts are activated, data can be exchanged between the landing pad and the UAV.

Figure 9:
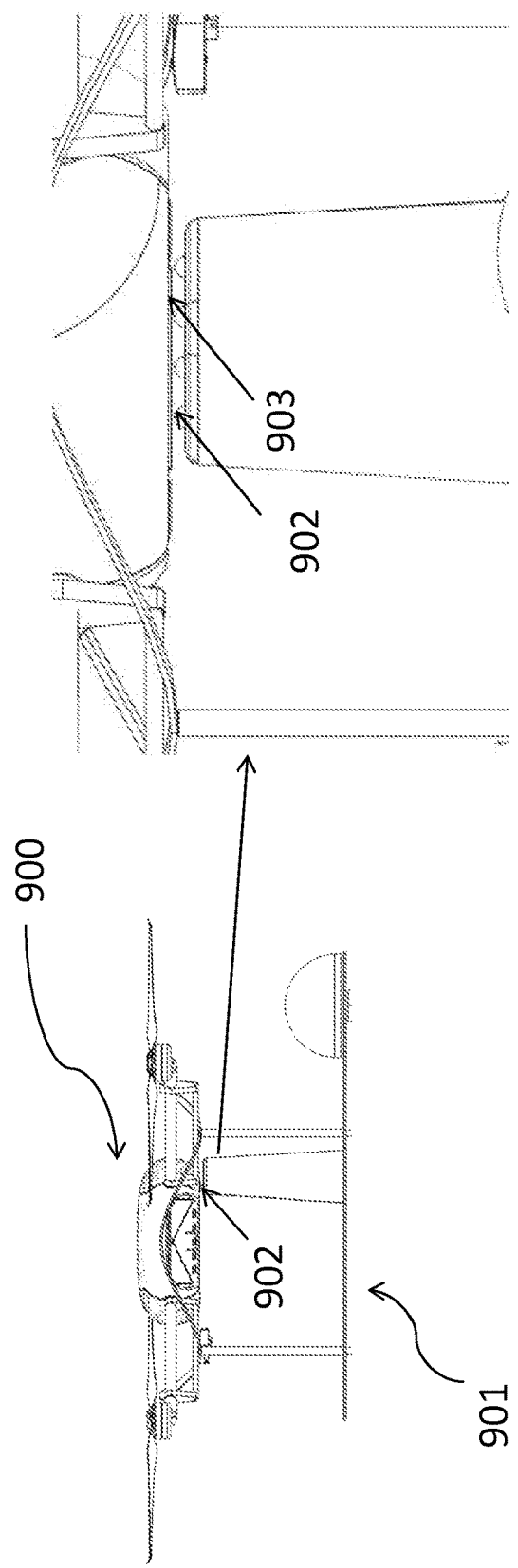
FIG. 9A is a UAV in a correctly aligned orientation on a landing pad in connection with a structure comprising electrical contacts.
FIG. 9B is a close up view of a UAV in a correctly aligned orientation on a landing pad in connection with a structure comprising electrical contacts.

FIG. 9A shows an example of a UAV 900 on a landing pad 901. The UAV is correctly aligned on the landing pad such that one or more electrical contacts of the UAV can be connected to one or more electrical contacts 902 on the landing pad. FIG. 9B shows a close up region of the contact area between the electrical contacts on the UAV 903 and the electrical contacts 902 on the landing pad. The contacts on the landing pad can be sized and spaced such that each contact touches only one corresponding electrical contact on the UAV.

Each of the electrical contacts or subset of the electrical contacts can have a distinct function. For example, one or more contacts can be configured to provide information to the UAV from the landing pad. The landing pad can communicate flight information, environmental information, or a user control input to the UAV through the electrical contact. In an example, flight information can be distance to the next landing pad, distance to the next destination, or a flight instruction (e.g., instruction to fly in a direction, at an altitude, or to a location). Environmental information can be current weather conditions, forecasted weather conditions, wind speed, wind direction, or remaining daylight hours. A user control input to the UAV can be a flight instruction, a surveillance instruction, or a request for sensor information. In some cases, one or more electrical contacts can be configured to receive information from the UAV; information from the UAV can be stored or instantaneous data from one or more sensors on-board the UAV. One or more electrical contacts can be configured to charge a battery on-board the UAV. In some cases, one or more electrical contacts can be configured to monitor the health of one or more systems on-board the UAV. In some cases, one or more electrical contacts can be configured to monitor the health (e.g., remaining charge) of one or more power systems on-board the UAV. Alternatively, the landing station and the UAV can communicate wirelessly without electrical contacts. An energy storage device on-board the UAV can charge wirelessly (e.g., through inductive charging) without physical connection to an electrical contact.

The landing pad can further comprise a plurality of markers in a predetermined geometric configuration on the landing pad. The markers can be detectable by the UAV to identify a location of the landing pad relative to a given location of the UAV. The UAV can detect one or more markers in the plurality of markers with a vision sensor on-board the UAV. The vision sensor can comprise a camera. The camera can be a charge-coupled device (CCD) camera. The camera can be a complementary metal-oxide semiconductor (CMOS) camera. Alternatively the vision sensor can be provided on the landing pad and the UAV can comprise a plurality of markers in a given or predetermined geometric configuration on the UAV.

The vision sensor can be affixed to the UAV with a predetermined position and orientation. The position and orientation of the vision sensor can be fixed. In some cases, the position and orientation of the vision sensor can be variable during operation of the UAV. The vision sensor can be movable independently of the UAV.

The one or more markers can be located with a known orientation (e.g., translation and/or rotation) relative to a landing pad. The one or more markers can be near a landing pad. The one or more markers can be provided on the landing pad. Alternatively, the one or more markers can be located with a known orientation (e.g., translation and/or rotation) relative to a UAV. The markers can be identified from one or more images captured by the vision sensor. The images can be still images or video images. The vision sensor can capture an image of the markers while the UAV is in flight. The one or more images can be processes to determine a location of the UAV relative to the plurality of markers. The markers can be on the landing station such that determining a location of the UAV relative to the plurality of markers comprising determining a location of the UAV relative to the landing pad.

Figure 10:
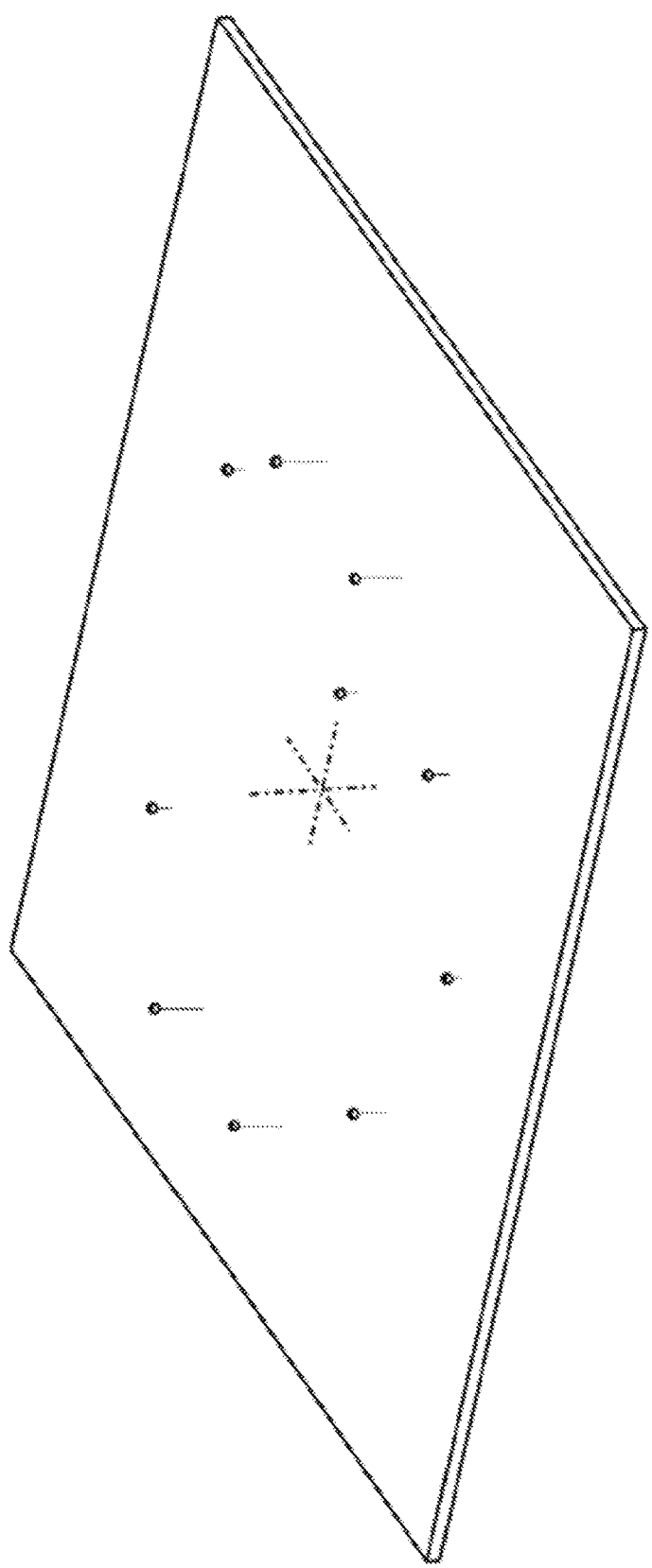
FIG. 10 is a marker that can be detected by a UAV.

FIG. 10 shows an example of a pattern of markers that can be identified from an image captured by the vision sensor. The markers can be any type of marker that is easily and/or readily identified using computer vision. The markers can be chosen to enable efficient recognition and accurate pose (e.g., orientation and position) calculation. In some cases the markers can comprise a 2-dimensional or 3-dimensional drawing or symbol. The markers can be composed of a reflective material. The markers can comprise a retro-reflecting object or a passive fiducial or high contrast pattern. In some cases the markers can comprise an energy emitter.

The energy emitter can be a light energy emitter. In some cases the light energy emitter can be a light emitting diode (LED) or another point light emitter.

Figure 11:
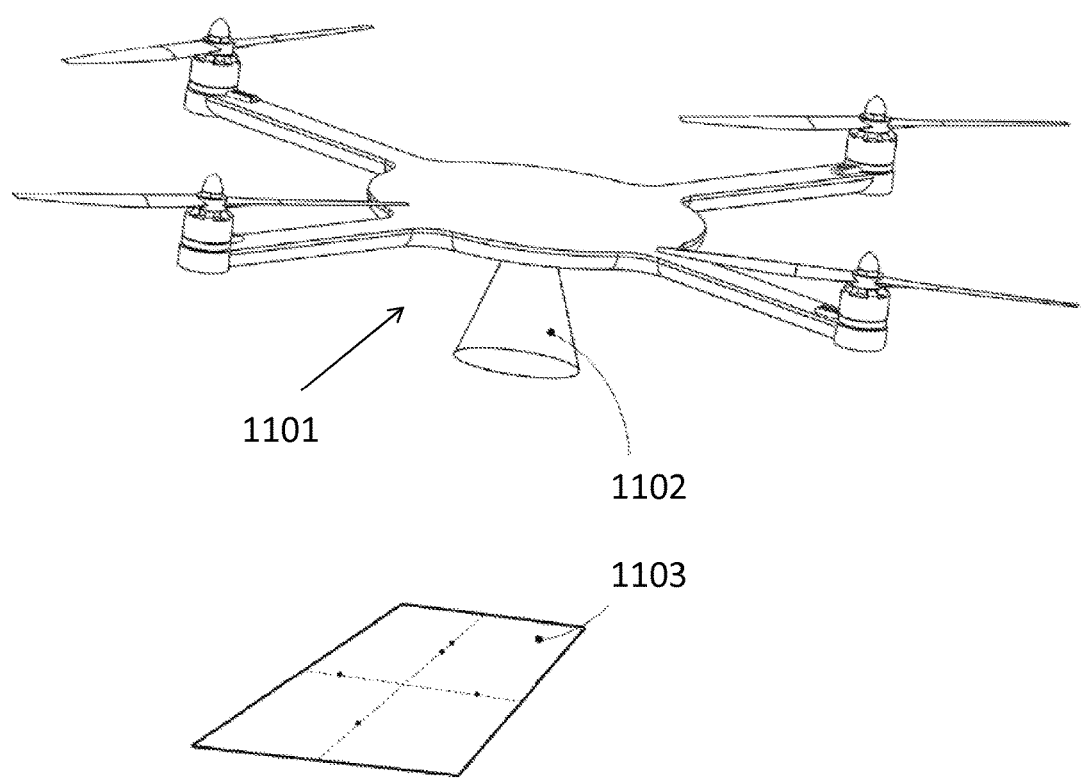
FIG. 11 is a UAV with a vision sensor configured to detect a marker.

The plurality of markers can aid in autonomously landing a UAV on a landing pad. The UAV can approach a landing pad. The UAV can know a rough or general location of a landing pad apriori or the UAV can recognize the landing pad by detection of the plurality of markers on the landing pad by the vision sensor on-board the UAV. The UAV can capture one or more images of the plurality of markers using the vision sensor on-board the UAV. The UAV can continuously capture and/or process images with the vision sensor during flight. Alternatively, the UAV can capture and/or process images only when searching from an object or plurality of marker. In some cases, the UAV can capture and/or process images only when the UAV is near a known location of a plurality of markers. FIG. 11 shows an example of a UAV 1101 with a vision sensor 1102. The vision sensor 1102 can be on-board the UAV 1101. The UAV can capture an image of a marker 1103 with the vision sensor 1102. The UAV can calculate, from the captured image of the marker, a location of the UAV relative to the marker. In some cases the calculation of the location of the UAV relative to the marker can occur on-board the UAV. In some cases the calculation of the location of the UAV relative to the marker can be performed off-board the UAV. The marker can be on or near a landing pad. The UAV can adjust its flight path as it approaches the landing pad based on the calculation of the location of the UAV relative to the landing pad.

The UAV can comprise one or more computer processors configured to calculate the orientation and/or position of the UAV relative to a detected marker. In some cases the computer processors can be on-board the UAV. Alternatively the computer processors can be off-board the UAV. The computer processors can be on the landing pad. The computer processor can be programmed to calculate the position and/or orientation of the marker with respect to the vision sensor on-board the UAV. The computer processor can be programmed to consider intrinsic properties and distortions associated with the vision sensor.

Figure 12:
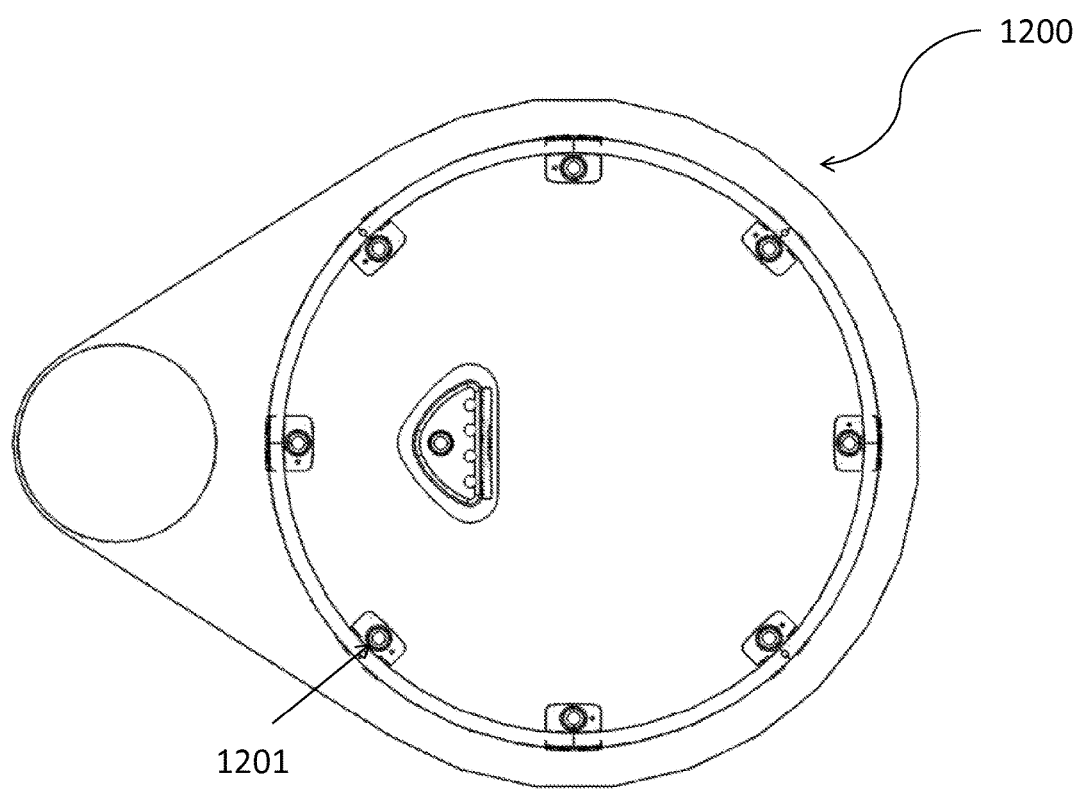
FIG. 12 is a marker that can be detected by a UAV comprising light emitting diodes (LEDs)

FIG. 12 shows an embodiment of a marker 1200 that can be provided on a landing pad. The marker can comprise a plurality of spaced energy emitters 1201 configured to emit an energy signal that can be detected by a vision sensor on-board the UAV. In some cases the energy emitters can be LEDs 1201. The LEDs 1201 can be provided in any pattern that can be recognized by the vision sensor of the UAV. In the embodiment shown in FIG. 12, the LEDS 1201 are spaced and arranged in a circular configuration. The LEDs 1201 can be placed in a 1-dimensional, 2-dimensional, or 3-dimensional pattern. A 3-dimensional pattern can comprise placement of the LEDs at different locations in a 3-dimensional coordinate system. For example, in a three dimensional coordinate system the LEDs can be in a pattern comprising LEDs with varying spacing in the length, width, and depth directions.

The marker 1200 can be on a landing pad. For example, the marker 1200 can be on the landing pad shown in FIG. 1. The marker can be attached to any surface and/or feature of the landing pad. The marker can be attached to the landing pad in a location such that the marker is visible to a UAV while the UAV is in flight. The marker can be attached to the landing pad in a location such that the marker is visible to a UAV while the UAV is approaching the landing pad. The marker can be attached to the landing pad in a location such that the marker is visible to a UAV while the UAV is landing on the landing pad. The markers can be attached to the track at a location along the track at or near a peak and/or a valley. In some cases, the marker can be in a location on the landing pad such that the marker is protected from impact with the UAV during landing of the UAV on the landing pad. In some cases, the marker can be in a location on the landing pad such that the marker is protected from impact with the UAV during takeoff of the UAV from the landing pad. In some cases, the markers can be protected from the UAV during takeoff and landing by a bumper.

In some embodiments, one or more markers in the plurality of markers can comprise high brightness infrared (IR) LEDs. The high brightness infrared LEDs can emit light at a wavelength that is largely absorbed by earth's upper atmosphere. For example, at least about 50%, 60%, 70%, 80%, 90% or 100% of the light emitted from the high brightness infrared LEDs can be absorbed by the earth's upper atmosphere. The wavelength of the light emitted by the high brightness infrared LEDs may not overlap with the wavelengths of light emitted by the sun. The vision sensor on-board the UAV can comprise an optical filter. The optical filter can be configured to isolate the wavelength or wavelengths of light emitted by the energy emitters on the marker (e.g., high brightness infrared LEDs). Detection false positives (e.g., detection of a marker by the vision sensor in a location where a marker is not present) can be reduced or eliminated with the combination of the optical filter and the LED emitting light at a wavelength that is not the wavelength of ambient light (e.g., sunlight).

High brightness LEDs can be detected by the vision sensor on-board the UAV when the UAV is a substantially far distance from the marker comprising the high brightness LEDs. The vision sensor can detect the marker from a distance of at least about 1 cm, 10 cm, 1 m, 5 m, 10 m, 15 m, 20 m, 25 m, 30 m, 40 m, or 50 m. In some instances, the UAV can use global positioning system (GPS) signals to approach a landing pad and detect a marker to locate an exact location of the landing pad. Resolution of a position measurement determined from the marker can be higher than resolution of a position measurement determined from the GPS signal. In some cases a lens can be used to augment the light emitted from one or more LEDs. Augmenting the light can comprise focusing the light. In some cases the light can be focused into a conical volume. The cone of light can be focused above the landing pad. The UAV can be instructed to fly within the cone of light. The UAV can be instructed not to leave the cone of light.

High brightness infrared LEDs can be damaging to human eyes. High brightness infrared LEDs can be outside of a spectrum of visible light such that they cannot be seen by human eyes. In some cases a human may not be able to detect light emitted from the high brightness infrared LEDs. The energy emitter in the marker can periodically turn on and off. Periodic on and off action by the energy emitter can comprise flashing or flickering. The flashing of light from the energy emitter (e.g., LED) can be synchronized with capturing of an image of the marker with the vision sensor on-board the UAV. Synchronizing the light flashing with the capturing of the image can comprise turning the light on during an image capture and off when an image is not being captured. The periodic on and off of the energy emitter can minimize the risk of damaging human eyes by the energy emitter. Additionally, the periodic on and off of the energy emitter can decrease the power usage of the energy emitter.

Synchronization of the light flashing and the image capture can occur without requiring accurate communication between a location where a marker is present (e.g., landing pad) and the UAV. The UAV and the landing pad can comprise a GPS sensor. The energy emitter periodic on and off timing can be synchronized with the GPS timing pulse of the GPS sensor on-board the landing pad. Similarly, the image capture by the vision sensor (e.g., shutter in the case of a camera) can be synchronized with the GPS timing pulse of the GPS sensor on-board the UAV. The synchronization of the energy emitter's periodic on and off and the image capture by the vision sensor can be based on the GPS timing pulse with a predetermined frequency, for example, the frequency can be at least about every 1, 5, 10, 15, 20, 25, 30, 35, 40, 45, 50, 55, 60, 65, 70, 75, 80, 85, 90, 95, or 100 pulses. The light emitted can be turned on or off at least about 2, 3, 4, 5, 6, 7, 8, 9, or 10 times between a first GPS pulse and second GPS pulse.

Computer Control Systems

Figure 13:
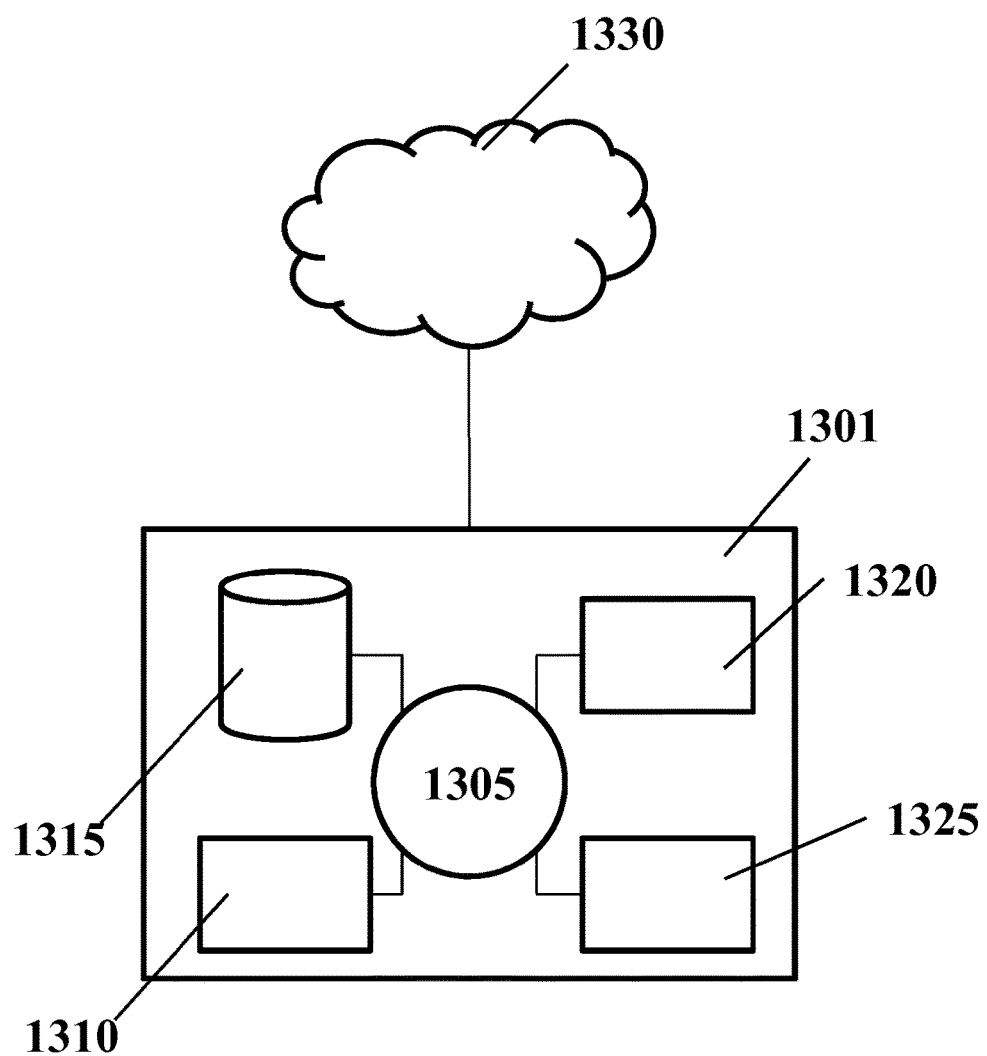
FIG. 13 shows a computer system that is programmed or otherwise configured to implement methods and systems of the present disclosure.

The present disclosure provides computer control systems that are programmed to implement methods of the disclosure. FIG. 13 shows a computer system 1301 that is programmed or otherwise configured to regulate a UAV, including landing and takeoff of the UAV from a landing pad. The computer system 1301 can be onboard the UAV or remotely located with respect to the UAV.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by one or more computer processors. In some examples, an algorithm for landing a UAV comprises one or more operations for directing the UAV to a landing station having a landing pad and aligning the UAV adjacent to the landing pad. An algorithm for landing a UAV can comprise one or more operations for detecting a marker and determining a relative distance between the UAV and the marker.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for landing an unmanned aerial vehicle (UAV), comprising:
   a landing pad with a base and a track, wherein the track is elevated off the base on separated risers, and wherein the track comprises an undulating surface forming a plurality of peaks and valleys around a central opening, wherein the landing pad (i) comes in contact with a plurality of elongated landing members of the UAV that extend radially from a center of the UAV, which elongated landing members are below a plurality of propulsion units of the UAV, and (ii) corrects misalignment of the UAV as the elongated landing members come in contact with the track.

2. The system of claim 1, wherein the track is a substantially closed track.

3. The system of claim 1, wherein the track is configured to absorb impact of the UAV during landing.

4. The system of claim 1, wherein the landing pad is configured such that, upon the landing members coming in contact with the track, the elongated landing members rest at the valleys when the UAV is aligned on track.

5. The system of claim 1, further comprising a plurality of electrical contacts, wherein the plurality of electrical contacts is activated by pressure from the UAV aligned on the track.

6. The system of claim 5, wherein the electrical contacts, when activated, provide power to an energy storage system on-board the UAV.

7. The system of claim 5, wherein the electrical contacts, when activated, exchange data with the UAV.

8. The system of claim 1, wherein the landing pad permits the UAV to autonomously land on the track.

9. The system of claim 1, wherein the landing pad permits the UAV to autonomously take off from the track.

10. The system of claim 1, further comprising a plurality of markers in a predetermined geometric configuration on the landing pad, wherein the markers are detectable by the UAV to identify a location of the landing pad relative to a given location of the UAV.

11. The system of claim 10, wherein the plurality of markers is protected from impact with the UAV during landing of the UAV on the landing pad.

12. The system of claim 10, wherein the markers are detectable by the UAV while the UAV is in flight.

13. A method for landing an unmanned aerial vehicle (UAV), comprising:
providing a landing pad with a base and a track, wherein the track is elevated off the base on separated risers, and wherein the track comprises an undulating surface forming a plurality of peaks and valleys around a central opening;
bringing a plurality of elongated landing members of the UAV in contact with the track, wherein the plurality of elongated landing members extend radially from a center of the UAV and are below a plurality of propulsion units of the UAV; and
correcting any misalignment of the UAV as the elongated landing members come in contact with the track.

14. The method of claim 13, wherein the track is a substantially closed track.

15. The method of claim 13, wherein the track absorbs impact of the UAV during landing.

16. The method of claim 13, wherein upon the landing members coming in contact with the track, the elongated landing members rest at the valleys when the UAV is aligned on track.

17. The method of claim 13, the landing pad further comprises a plurality of electrical contacts that are activated by pressure when the UAV is aligned on the track.

18. The method of claim 17, wherein the electrical contacts, when activated, provide power to an energy storage system on-board the UAV.

19. The method of claim 17, wherein the electrical contacts, when activated, exchange data with the UAV.

20. The method of claim 13, wherein (b) and (c) are performed autonomously as the UAV lands on the landing pad.

21. The method of claim 13, wherein the landing pad further comprises a plurality of markers in a predetermined geometric configuration, wherein the plurality of markers is detectable by the UAV to identify a location of the landing pad relative to a location of the UAV.

22. The method of claim 21, wherein the plurality of markers is protected from impact with the UAV during landing of the UAV on the landing pad.

23. The method of claim 21, wherein the plurality of markers are detectable by the UAV while the UAV is in flight.

24. A method for autonomously landing an unmanned aerial vehicle (UAV), comprising:
capturing one or more images of a plurality of markers on a landing station using one or more cameras on-board the UAV, wherein the plurality of markers have a predetermined geometric configuration;
with a computer processor, calculating from the one or more images a location of the UAV relative to the plurality of markers on the landing station;
landing the UAV on a track of the landing station, wherein the track is elevated above a base of the landing pad on separated risers, and wherein the track comprises an undulating surface forming a plurality of peaks and valleys around a central opening, and wherein the calculated location of the UAV relative to the plurality of markers on the landing station is used to approach and land the UAV on the track; and
correcting any misalignment of the UAV on the track.

25. The method of claim 24, wherein the calculating is performed using one or more computer processor onboard the UAV or the landing station.

26. The method of claim 24, wherein the one or more images of the plurality of markers are captured by the UAV while the UAV is in flight.

27. The method of claim 24, wherein the plurality of markers comprise each comprises one or more light emitting diodes (LEDs).

28. The method of claim 27, further comprising synchronizing (1) a flashing of light from the one or more LEDs with (2) capturing one or more images of the plurality of markers using one or more cameras on-board the UAV.

29. The method of claim 24, wherein the track absorbs impact of the UAV during landing on the track.

30. The method of claim 24, further comprising activating a plurality of electrical contacts when the UAV is aligned on the track.

31. The method of claim 30, wherein the electrical contacts provide power to an energy storage system on-board the UAV when activated.

32. The method of claim 30, wherein the electrical contacts exchange data with the UAV when activated.

33. The method of claim 24, wherein the plurality of markers is protected from impact with the UAV during landing of the UAV on the landing station.

34. The method of claim 24, wherein the track is a closed track.

35. The method of claim 24, wherein correcting any misalignment of the UAV on the track comprises correcting any misalignment in three dimensions.

* * * * *